(12) United States Patent
McKaig

(10) Patent No.: US 6,904,925 B2
(45) Date of Patent: Jun. 14, 2005

(54) GAS ASSIST MOLD DUMP VALVE

(75) Inventor: Andrew McKaig, Chesapeake, VA (US)

(73) Assignee: Bauer Compressors, Inc., Norfolk, VA (US)

( * ) Notice: Subject to any disclaimer, the term of this patent is extended or adjusted under 35 U.S.C. 154(b) by 0 days.

(21) Appl. No.: 09/827,053

(22) Filed: Apr. 5, 2001

(65) Prior Publication Data

US 2002/0148511 A1 Oct. 17, 2002

(51) Int. Cl.$^7$ .................................................. G05D 7/01
(52) U.S. Cl. ........................................... 137/12; 137/102
(58) Field of Search ................................. 137/102, 540, 137/12

(56) References Cited

U.S. PATENT DOCUMENTS

| | | | | |
|---|---|---|---|---|
| 2,816,563 A | * | 12/1957 | Pappas | 137/102 |
| 3,006,694 A | * | 10/1961 | Valentine et al. | 137/102 |
| 3,034,527 A | * | 5/1962 | Hennells | 137/102 |
| 3,606,904 A | * | 9/1971 | Taylor | 137/102 |
| 3,747,625 A | * | 7/1973 | Reilly | 137/102 |
| 3,967,635 A | * | 7/1976 | Sealfon et al. | 137/102 |
| 4,041,970 A | * | 8/1977 | Peters | 137/102 |
| 4,942,006 A | | 7/1990 | Loren | 264/50 |
| 5,151,278 A | | 9/1992 | Baxi et al. | 425/130 |
| 5,164,200 A | | 11/1992 | Johnson | 425/130 |
| 5,174,932 A | | 12/1992 | Johnson et al. | 264/39 |
| 5,186,884 A | | 2/1993 | Hendry | 264/572 |
| 5,198,240 A | | 3/1993 | Baxi | 425/145 |
| 5,200,127 A | | 4/1993 | Nelson | 264/85 |
| 5,208,046 A | | 5/1993 | Shah et al. | 425/130 |
| 5,232,711 A | | 8/1993 | Hendry | 425/130 |
| 5,299,598 A | * | 4/1994 | Quartana et al. | 137/540 |
| 5,302,339 A | | 4/1994 | Baxi et al. | 264/572 |
| 5,304,058 A | | 4/1994 | Gill | 425/562 |
| 5,484,278 A | | 1/1996 | Berdan | 425/533 |
| 5,511,967 A | | 4/1996 | Berdan | 425/533 |
| 5,705,201 A | | 1/1998 | Ibar | 425/130 |
| 6,000,925 A | | 12/1999 | Daniels | 425/130 |

* cited by examiner

*Primary Examiner*—Gerald A. Michalsky
(74) *Attorney, Agent, or Firm*—Gifford, Krass, Groh, Sprinkle, Anderson & Citkowski, P.C.

(57) ABSTRACT

This invention concerns a gas assist mold dump valve positioned between a gas controller and a mold cavity. Preferably, the valve includes a pressure regulator having a body with a gas inlet and a gas outlet. A vent is formed in the body between the gas inlet and the gas outlet. The inlet is in fluid communication with the gas controller and the outlet is in fluid communication with the mold cavity. A piston is mounted for reciprocal motion within the body and is movable between a first position to close and a second position to open the vent. Finally, a check valve communicates with the inlet and the outlet and has an open position that allows gas to flow from the inlet to the outlet and a closed position to close off the flow of gas from the outlet to the inlet. In operation, gas entering the inlet urges the piston toward its first position, passes through the check valve into the outlet and then enters said mold cavity. Gas exiting the mold cavity urges the piston toward its second position to open the vent and expel the gas. This arrangement permits the controller to monitor mold cavity pressures without the flow of gas and contaminants from the mold cavity back through the controller.

9 Claims, 5 Drawing Sheets

GAS ASSIST MOLD DUMP VALVE

BACKGROUND

1. Field of the Invention

The present invention is directed to an apparatus for controlled venting of gas and particulate contaminants from a gas assist injection mold. More specifically, the present invention is directed to a gas assist mold dump valve that utilizes a gas controller to regulate the venting of gas from the mold cavity.

2. Reference to Related Art

During gas assist injection molding, the gas used to pack out the mold cavity must be vented before the mold may be opened to remove the molded part. Typically, this venting is regulated by the same device that is used to pressurize the mold, i.e., a gas controller. As a result of this dual use, the gas controller is directly exposed to particulate matter and condensing gases that are emitted from the mold cavity following the packing process. These expelled contaminants will characteristically coat the system of tubing which connects the gas controller to the mold. Over time, contaminant build-up restricts the tubing and may cause a significant decrease in the functionality and efficiency in the operations of the controller. The controller is also susceptible to damage caused by the build-up of mold gas contaminants exposed to particulate matter and condensing gases emitted from the mold cavity.

A variety of methods are disclosed in the prior art to overcome these and other harmful effects of the backflow of particulate matter through the gas controller or the tubing connecting the controller to the mold. One method uses a check valve disposed within the tubing between the controller and the mold to vent the mold gases directly to the atmosphere or into a recycling system. In an alternative method, a mechanically opened valve is mounted on the mold inlet tubing downstream of the check valve.

While these prior art methods permit venting of the mold without backflow of contaminants through the gas controller, they have the disadvantage of isolating the mold cavity from the gas controller during the entire venting phase of production. More importantly, the gas controller no longer has the ability to control the venting of the mold cavity. Therefore, it would be advantageous to have a means of venting the mold cavity wherein a gas controller retains the ability to regulate venting operations without the need to pass contaminated mold gas back through the controller.

SUMMARY OF THE INVENTION

A gas assist mold dump valve of the present invention includes a dome loaded pressure regulator having a piston to apply a predetermined pressure to the regulator. The pressure is calibrated to be greater than one to one, but preferably as close to 1:1, dome-to-seat ratio as will provide sufficient bias pressure to the seat side of the regulator to be able to hold a seal. This calibration allows the downstream valve pressure to be closed and balanced by the upstream pressure. Preferably, the one-to-one ratio allows the valve to dump the downstream pressure equal to the lowest set point pressure attainable by the upstream gas controller.

Preferably, the valve of the present invention includes a pressure regulator having a body with a gas inlet and a gas outlet. A vent is formed in the body between the gas inlet and the gas outlet. The inlet is in fluid communication with the gas controller and the outlet is in fluid communication with the mold cavity. A piston is mounted for reciprocal motion within the body and is movable between a first position to close and a second position to open the vent. Finally, a check valve communicates with the inlet and outlet and has an open position that allows gas to flow from the inlet to the outlet and a closed position to close off the flow of gas from the outlet to the inlet. The check valve maintains a slight bias back pressure due to its internal spring being connected in parallel to the dump valve, or being incorporated into the same valve body, bypassing the valve piston. The check valve and an associated bypass tube provide a gas path for pressurization of the mold and check the flow of gas coming from the mold.

In operation, gas entering the inlet urges the piston toward its first position, passes through the check valve into the outlet and then enters the mold cavity. Gas exiting the mold cavity urges the piston toward its second position to open the vent and expel the gas. This arrangement permits the controller to monitor mold cavity pressures while prohibiting the flow of gas and contaminants from the mold cavity back through the controller.

DETAILED DESCRIPTION OF THE PREFERRED EMBODIMENTS

Figure 1:
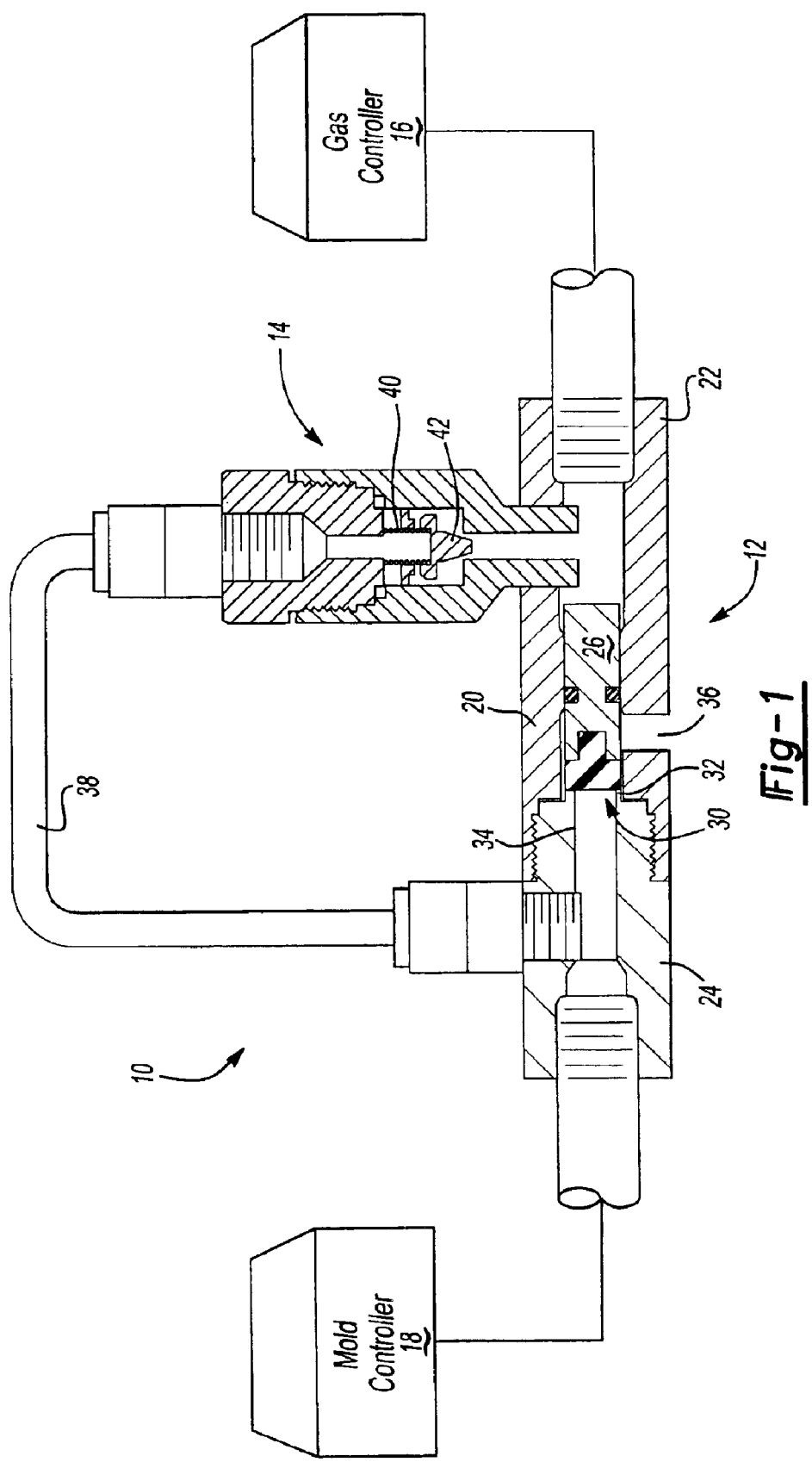
FIG. 1 is a cross-sectional view of a preferred embodiment of a gas assist mold dump valve constructed in accordance with the present invention.

Referring to FIG. 1, there is shown a preferred embodiment of a gas assist mold dump valve apparatus 10 constructed in accordance with the present invention including a dome loaded pressure regulator 12 and a check valve 14 positioned between a gas controller 16 and a mold 18.

Still referring to FIG. 1, the pressure regulator 12 of the present invention includes a regulator body 20 having a gas inlet portion 22 and a gas outlet portion 24. A piston 26 is preferably slidably disposed within the gas inlet portion 22 and is slidable between a first position (not shown) and a second position 30 where it sealingly contacts the seat 32 of an end 34 of the outlet portion 24. A vent 36 is preferably provided in the inlet portion 22 of the body 20 proximate the piston 26. In the first position the piston 26 is spaced from the end 34 so that gas can pass around the piston 26 to the vent 36.

The piston 26 is dimensioned so that the regulator 12 is calibrated to have a ratio greater than 1:1, but preferably near to 1:1, dome-to-seat area ratio so that (as will be further explained below) when the piston 26 is in the second position 30 (see FIG. 2), it will apply bias pressure to the seat 32 on the outlet portion 24 and create a seal. Use of the near 1:1 ratio also permits the piston 26 to be closed and balanced by upstream pressure from the gas controller 16. More preferably (as will be discussed below), the close to 1:1 ratio will allow the valve 10 of the present invention to dump downstream pressure equal to the lowest set point pressure attainable by the upstream gas controller 16.

Still referring to FIG. 1, there is shown a check valve 14 affixed to the gas inlet 22 portion of the regulator 12. Preferably, the check valve 14 includes an internal spring 40 that applies a slight bias back pressure to the valve head 42. Therefore, the bias arrangement of the check valve 14 provides a passage for the gas from the gas controller 16 to pressurize the mold 18, but checks the flow of gas coming from the mold 18.

A bypass tube 38 connects the check valve 14 to the gas outlet portion 24 of the regulator 12. Preferably, the check valve 14 is incorporated into the same valve 10 body as the regulator 12.

Figure 2:
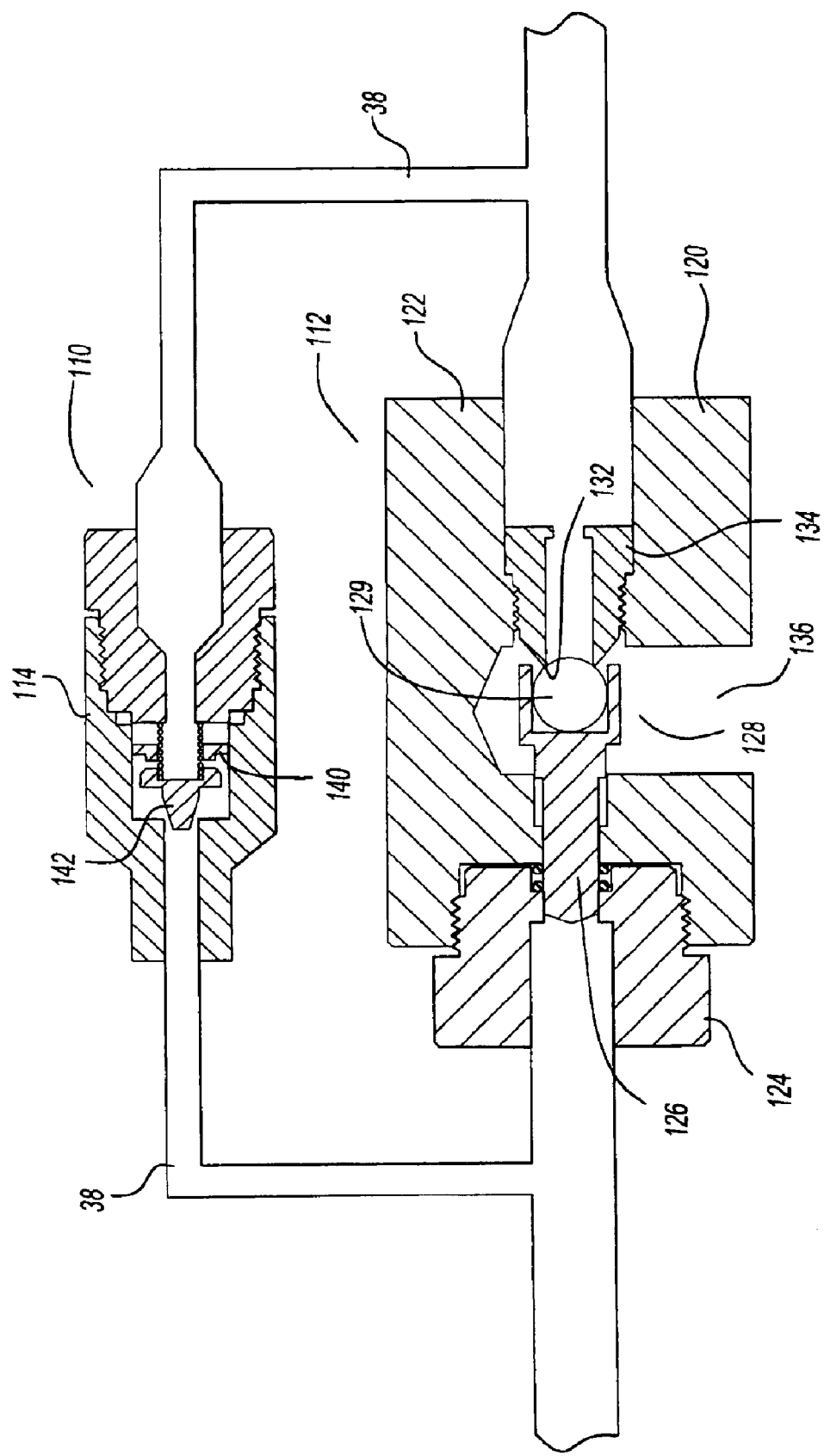
FIG. 2 is a cross-sectional view of an alternative embodiment of a gas assist mold dump valve constructed in accordance with the present invention showing the check valve in the open position and the pressure regulating piston in the closed position to thereby pressurize the mold cavity.
Figure 3:
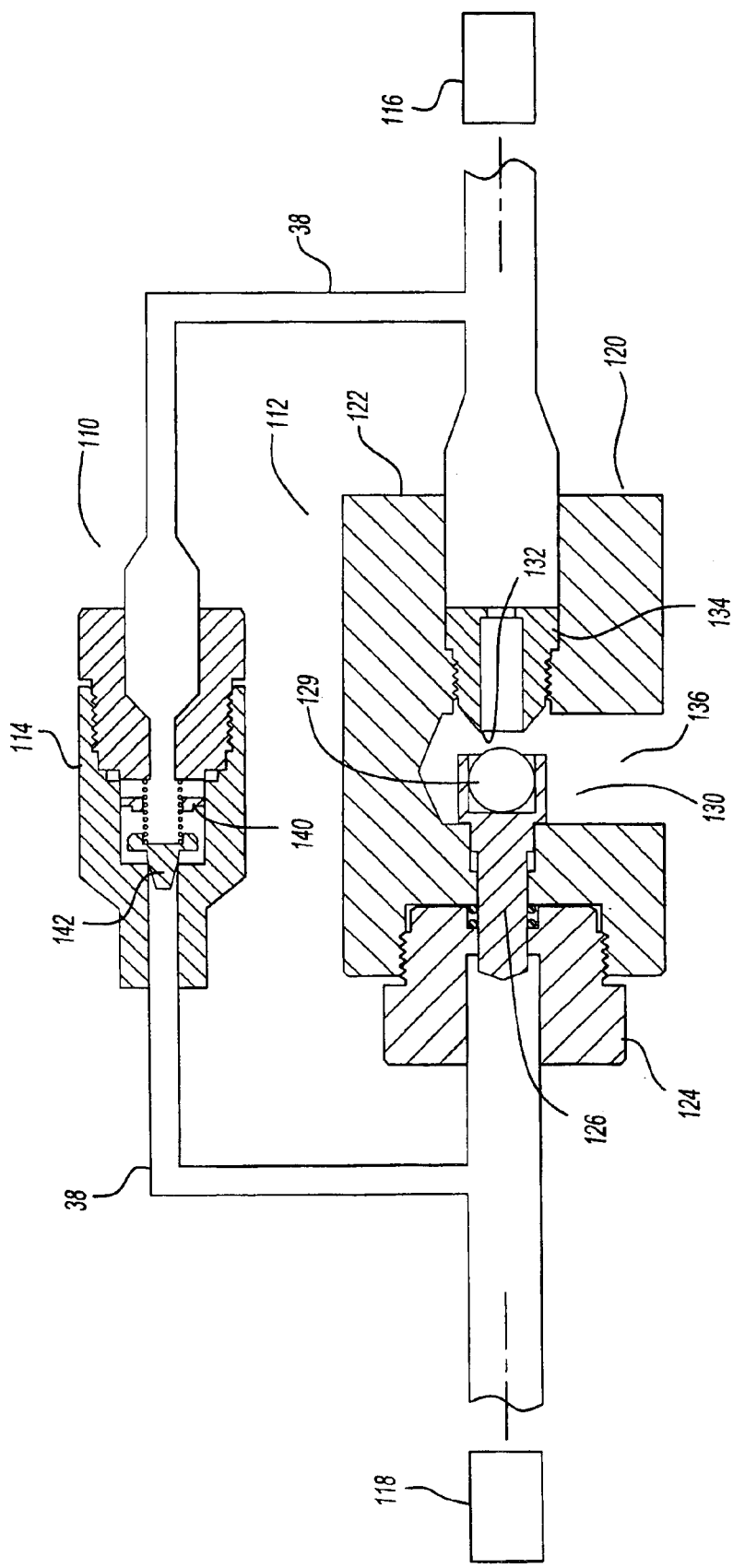
FIG. 3 is a cross-sectional view of an alternative embodiment of a gas assist mold dump valve constructed in accordance with the present invention showing the check valve in the closed position and the pressure regulating piston in the open position to vent the mold cavity.

Referring now to FIGS. 2 and 3, there is shown another preferred embodiment of a gas assist mold dump valve apparatus 110 constructed in accordance with the present invention and including a dome loaded pressure regulator 112 and a check valve 114 positioned between a gas controller 116 and a mold 118. The embodiment of the present invention shown in FIGS. 2 and 3 functions substantially the same as the embodiment shown in FIG. 1 and differs from the embodiment shown in FIG. 1 in essentially only in the location of the various parts of the valve apparatus 110. For this reason the various parts of the regulator 110 have been provided with reference numerals differing from the reference numerals of the embodiment of FIG. 1 by including a preceding numeral 1.

Still referring to FIGS. 2 and 3, the pressure regulator 112 of the present invention includes a regulator body 120 having a gas inlet portion 122 and a gas outlet portion 124. A piston 126 is preferably slidably disposed within the gas inlet portion 122 and is slidable between a first position 128 and a second position 130 (see FIG. 3). In the first position 128 a ball portion 129 of the piston 126 sealingly contacts a seat 132 of an end 134 of the outlet portion 124. A vent 136 is preferably provided in the inlet portion 122 of the body 120 proximate the piston 126. In the second position of the piston 126 the ball portion 129 is moved away from the seat 132 to open the vent 136.

The piston 126 is dimensioned so that the regulator 112 is calibrated to have a ratio greater than 1:1, but preferably near to 1:1, dome-to-seat area ratio so that (as will be further explained below) when the piston 126 is in the second position 128 (see FIG. 2), it will apply bias pressure to the seat 132 on the outlet portion 124 and create a seal. Use of the near 1:1 ratio also permits the piston 126 to be closed and balanced by upstream pressure from the gas controller 116. More preferably (as will be discussed below), the close to 1:1 ratio will allow the valve 110 of the present invention to dump downstream pressure equal to the lowest set point pressure attainable by the upstream gas controller 116.

Still referring to FIGS. 2 and 3, there is shown communicating with a bypass tube 138 communicating between the gas inlet 122 and the outlet 124 of the regulator 112. A check valve 114 is provided in the bypass 138. Preferably, the check valve 114 includes an internal spring 140 that applies a slight bias back pressure to a valve head 142. Therefore, the bias arrangement of the check valve 114 provides a passage for the gas from the gas controller 116 to pressurize the mold 118 (see FIG. 2), but checks the flow of gas coming from the mold 118 (see FIG. 3).

Unlike the embodiment of FIG. 1, in the embodiment of FIGS. 2 and 3, the check valve 114 is connected in parallel to the regulator 112 between segments of the bypass tube 138. The check valve 114 is connected to the gas outlet portion 124 of the regulator 112. Preferably, the check valve 114 is incorporated into the same valve body 110 as the regulator 112.

Figure 4:
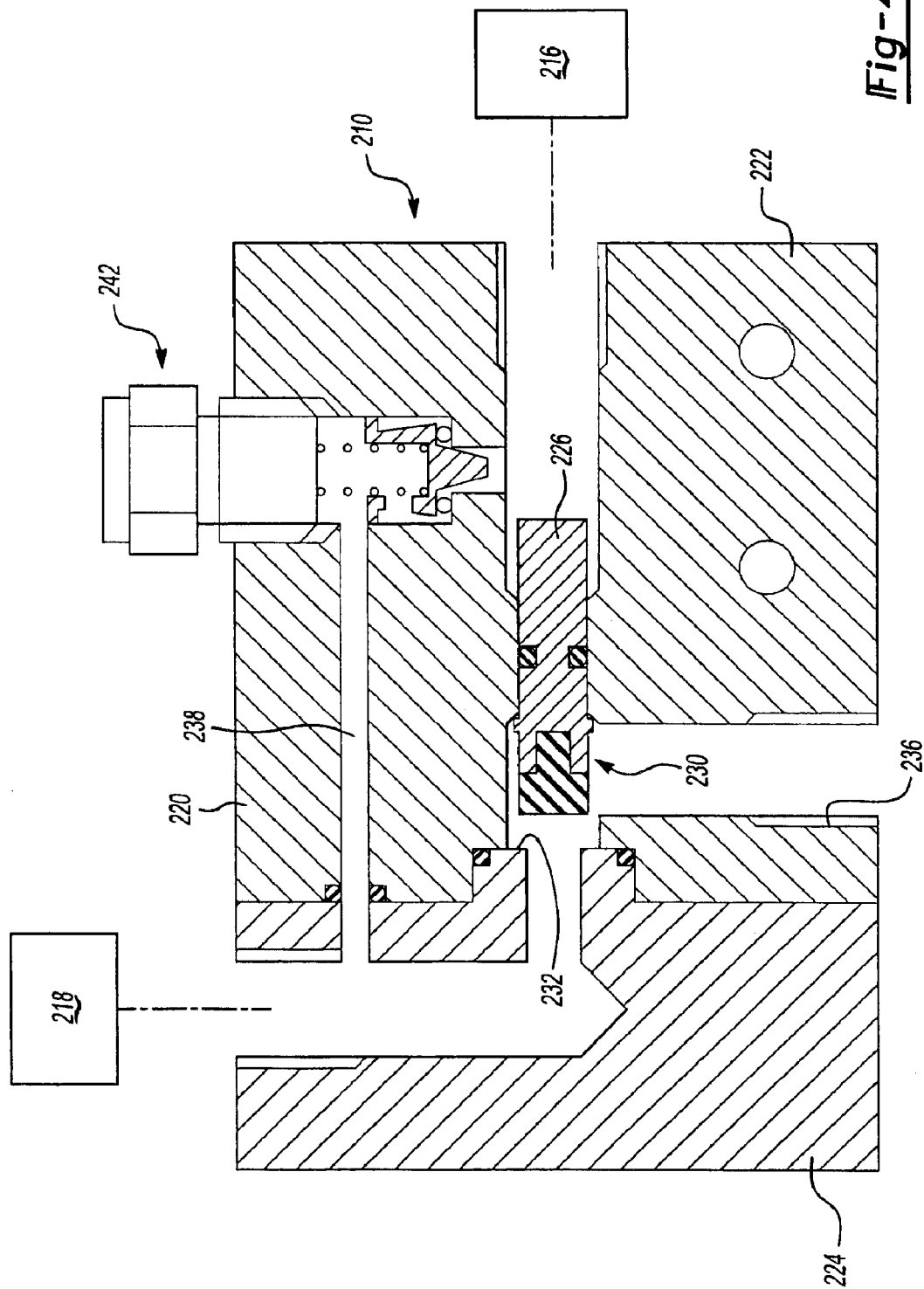
FIG. 4 is a cross-sectional view of a further alternative embodiment of a gas assist mold dump valve constructed in accordance with the present invention showing the check valve in the closed position and the pressure regulating piston in the open position to vent the mold cavity.
Figure 5:
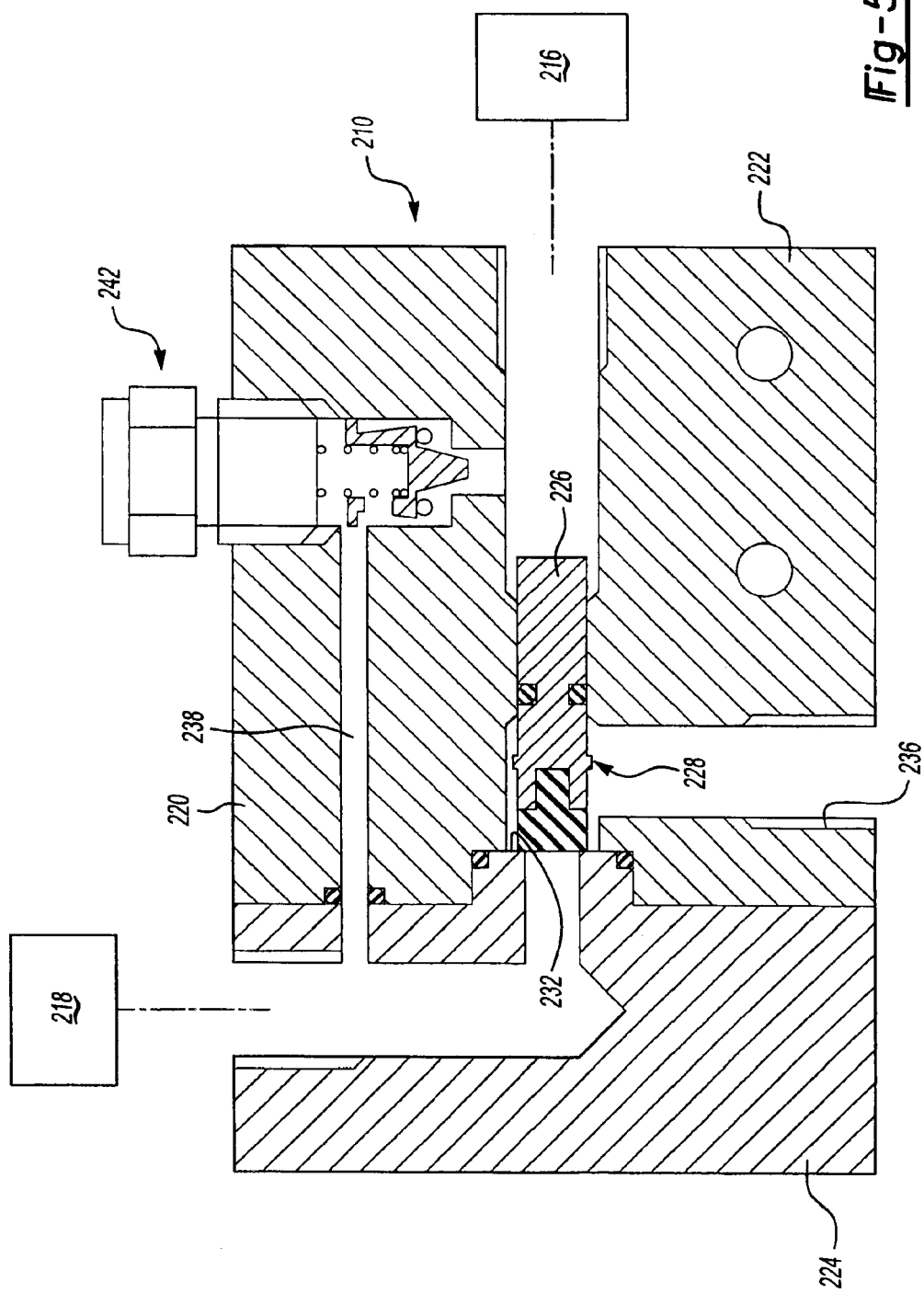
FIG. 5 is a cross-sectional view of the embodiment shown in FIG. 4 but illustrating the check valve in the open position and the pressure regulating piston in the closed position to thereby pressurize the mold cavity.

Referring now to FIGS. 4 and 5, there is shown a further alternative embodiment of a gas assist mold dump valve 210 constructed in accordance with the present invention. Preferably, the further embodiment includes a regulator 220 having a gas inlet portion 222 and a gas outlet portion 224. A piston 226 is slidably disposed within the gas inlet portion 222 and is slidable between a first position 228 (FIG. 5) and a second position 230 (FIG. 4). In the first position 228 the piston 226 sealingly contacts a seat 232 formed in the outlet portion 224. In the second position 230 the piston 226 is spaced a way from the seat 232. A vent 236 is preferably provided in the inlet portion 222 of the body 220 approximate the piston 226 so that with the piston 226 in the first position 228 flows through the inlet portion 222 and the outlet portion 224 is closed but the piston 226 is subjected to pressure from the inlet side and the outlet side of the regulator. When the gas outlet pressure overcomes the gas inlet pressure, the piston 226 is moved to position 230 and the gas is vented through vent 236.

The gas inlet portion 222 of the regulator body 220 includes a bypass passage 238 that connects the gas inlet portion 222 of the regulator 220 to the gas outlet portion 224. A check valve 242 is provided in the passage 238 and opens when the difference between gas inlet pressure and gas outlet pressure exceeds a predetermined value. The gas inlet portion 222 of the regulator 220 is in fluid communication with a controller 216 and the gas outlet portion 224 of the regulator 220 is connected to a mold 218 to the gas outlet portion 224 of the regulator 220.

Although only the operation of the embodiment of FIGS. 2 and 3 will be described in detail it should be apparent that the embodiment of FIG. 1 and the embodiment of FIG. 4 and FIG. 5 function substantially the same as the embodiment of FIGS. 2 and 3. In operation, upon receiving a start signal from the molding unit, the gas controller 116 located upstream from the valve 110 will begin to pressurize the gas inlet portion 122 of the regulator 112. As the pressure within the inlet 122 increases, the piston 126 is urged from a first position 128 (see FIG. 3) to a second position 130 (see FIG. 2) and thereby sealingly closing the vent 136. Thereafter, the increase in pressure within the inlet portion 122 urges the check valve 114 to open and permits gas to flow through the bypass tube 138 to the gas outlet portion 124 and into the mold cavity 118. Therefore, during this pressurization phase, the gas controller 116 maintains full control of the increasing pressure in the mold cavity 118.

Referring now to FIG. 3, at the point at which the pressure profile of the mold cavity must begin to be decreased, the gas controller 116 will decrease the pressure of the gas entering the valve 110. As pressure on the inlet 122 of the regulator 112 is decreased, the internal spring 140 of the check valve 114 will urge the check valve 114 back into a closed and sealed configuration. As a result of the closing of the check valve 114, contaminated gas from the mold is prevented from flowing back into the controller 116.

As the pressure on the gas inlet portion 122 of the check valve 114 is further decreased by the controller 116, the pressure on the piston 126 from the gas inlet portion 122 (i.e., the force holding the piston 126 in the first position) will also decrease. As a result, gas pressure from the mold cavity 118 will urge the piston 126 into the second position 130. Preferably, the return of the piston 126 to the second position 130 opens the vent 136 and permits release of the mold cavity gas to the atmosphere.

Notably, if the pressure applied by the gas controller 116 were to increase at any time during the pressure profile, the increase in pressure would be reflected by an increase in the force of the piston 126 and the vent 136 would again close.

An increase in pressure would also force open the check valve 114 and be reflected by an increase in the mold pressure. Any subsequent decrease in the gas controller pressure would allow the check valve 114 to close and due to the decreasing pressure force on the piston 126, the gas would again pass through the vent 136 from the mold until the pressures on the piston 126 are once again equal.

It should be apparent that a gas controller for a molding operation has been provided which permits control of the supply and the venting of gas to and from a mold without the backflow of gases through the controller.

Although, the present invention has been described in terms of specific preferred embodiments, it will be appreciated that various other modifications and alterations might be made by those skilled in the art without departing from the spirit and scope of the invention as set forth in the following claims.

I claim:

1. A gas assist mold dump valve comprising:
a gas controller operable to provide a first fluid stream at a first pressure;
said first pressure being regulated by said gas controller;
a mold cavity operable to receive a fluid from the first fluid stream and discharge the fluid in a second fluid stream at a second pressure;
a regulator having an inlet, an outlet and a vent, the inlet being in fluid communication with the gas controller, the outlet being in fluid communication with the mold cavity, the vent having a vent seat and being in fluid communication with the mold cavity; and
a piston having a dome end and a seat end, the piston being mounted in the regulator for reciprocal movement toward and away from the vent seat and being dimensioned such that the regulator is calibrated to have a near 1:1 dome-to-seat area ratio, the seat end being engagable with the vent seat to open and close the vent, the dome end being in fluid communication with the inlet, the second fluid stream acting on the seat end of the piston and the first fluid stream acting on the dome end of the piston such that the seat end contacts the vent seat and movement of the piston is in positional balance and wherein an increase in the second pressure relative to the first pressure moves the seat end out of contact with the vent seat such that excess pressure in the second fluid stream relative to the first fluid stream is discharged from the mold cavity.

2. The gas assist mold dump valve of claim 1, further comprising a check valve disposed between and in fluid communication with the inlet and the outlet, the check valve having a valve head and an internal spring, the valve head being moveable between an open position that permits the first fluid stream to flow from the inlet to the outlet and a closed position that prohibits the second fluid stream flowing from the outlet to the inlet.

3. The gas assist mold dump valve of claim 2 wherein the check valve includes a valve head and an internal spring, the internal spring biasing the valve head the said closed position.

4. A gas assist mold dump valve comprising:
a gas controller operable to provide a first fluid stream at a first pressure:
said first pressure being regulated by said gas controller;
a mold cavity operable to receive a fluid from the first fluid stream and discharge the fluid in a second fluid stream at a second pressure;
a regulator having an inlet, an outlet and a vent, the inlet being in fluid communication with the gas controller, the outlet being in fluid communication with the mold cavity, the vent having a vent seat and being in fluid communication with the mold cavity; and
a piston having a dome end and a seat end, the piston being mounted in the regulator for reciprocal movement toward and away from the vent seat and being dimensioned such that the regulator is calibrated to have a near 1:1 dome-to-seat area ratio, the seat end being engagable with the vent seat to open and close the vent, the dome end being in fluid communication with the inlet, the second fluid stream acting on the seat end of the piston and the first fluid stream acting on the dome end of the piston such that the seat end contacts the vent seat and movement of the piston is in positional balance and wherein an increase in the second pressure relative to the first pressure moves the seat end out of contact with the vent seat such that excess pressure in the second fluid stream relative to the first fluid stream is discharged from the mold cavity.

5. The gas assist mold dump valve of claim 4, further comprising a check valve disposed between and in fluid communication with the inlet and the outlet, the check valve having a valve head and an internal spring, the valve head being moveable between an open position that permits the first fluid stream fluid to flow from the inlet to the outlet and a closed position that prohibits the flow of the second fluid stream from the outlet to the inlet.

6. The gas assist mold dump valve of claim 5 wherein the check valve includes a valve head and an internal spring, the internal spring biasing the valve head the said closed position.

7. A method for controlling a valve gas assist mold dump valve comprising the steps of:
providing a gas controller operable to provide a first fluid stream at a first pressure;
said first pressure being regulated by said gas controller;
providing a mold cavity operable to receive a fluid from the first fluid stream and discharge the fluid in a second fluid stream at a second pressure;
providing a regulator having an inlet, an outlet and a vent, the inlet being in fluid communication with the gas controller, the outlet being in fluid communication with the mold cavity, the vent having a vent seat and being in fluid communication with the mold cavity; and
providing a piston having a dome end and a seat end, the piston being mounted in the regulator for reciprocal movement toward and away from the vent seat and being dimensioned such that the regulator is calibrated to have a near 1:1 dome-to-seat area ratio, the seat end being engagable with the vent seat to open and close the vent, the dome end being in fluid communication with the inlet, providing a check valve disposed between and in fluid communication with the inlet and the outlet, the check valve being biased in a closed position and being moveable to an open position the open position permitting the first fluid stream to flow from the inlet to the outlet and the closed position prohibiting the second fluid stream flowing from the outlet to the inlet;

supplying the first fluid stream from the gas controller to the gas inlet, the first fluid stream acting on the dome end of the piston such that seat end engages the vent seat and the first pressure being sufficient to place the check valve in the open position such that fluid is communicated into the mold cavity;

discharging the second fluid stream from the mold cavity, the second fluid stream acting on the seat end of the piston and the first fluid stream acting on the dome end of the piston such that the seat end contacts the vent seat and movement of the piston is in positional balance and wherein an increase in the second pressure relative to the first pressure moves the seat end out of contact with the vent seat such that excess pressure in the second fluid stream relative to the first fluid stream is discharged from the mold cavity.

8. A method for controlling a valve gas assist mold dump valve comprising the steps of:

providing a gas controller operable to provide a first fluid stream at a first pressure;

said first pressure being regulated by said gas controller;

providing a mold cavity operable to receive a fluid from the first fluid stream and discharge the fluid in a second fluid stream at a second pressure;

providing a regulator having an inlet, an outlet and a vent, the inlet being in fluid communication with the gas controller, the outlet being in fluid communication with the mold cavity, the vent having a vent seat and being in fluid communication with the mold cavity; and providing a piston having a dome end and a seat end, the piston being mounted in the regulator for reciprocal movement toward and away from the vent seat and being dimensioned such that the regulator is calibrated to have a near 1:1 dome-to-seat area ratio, the seat end being engagable with the vent seat to open and close the vent, the dome end being in fluid communication with the inlet, providing a check valve disposed between and in fluid communication with the inlet and the outlet, the check valve being biased in a closed position and being moveable to an open position the open position permitting the first fluid stream to flow from the inlet to the outlet and the closed position prohibiting the second fluid stream flowing from the outlet to the inlet;

supplying the first fluid stream from the gas controller to the gas inlet, the first fluid stream acting on the dome end of the piston such that seat end engages the vent seat and the first pressure being sufficient to place the check valve in the open position such that fluid is communicated into the mold cavity;

discharging the second fluid stream from the mold cavity, the second fluid stream acting on the seat end of the piston and the first fluid stream acting on the dome end of the piston such that the seat end contacts the vent seat and movement of the piston is in positional balance and wherein an increase in the second pressure relative to the first pressure moves the seat end out of contact with the vent seat such that excess pressure in the second fluid stream relative to the first fluid stream is discharged from the mold cavity.

9. The mold dump valve of claim 8 wherein the check valve includes having a valve head and an internal spring, the internal spring biasing the valve head the said closed position.

* * * * *